(12) United States Patent
Radi et al.

(10) Patent No.: US 11,503,140 B2
(45) Date of Patent: Nov. 15, 2022

(54) PACKET PROCESSING BY PROGRAMMABLE NETWORK INTERFACE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/172,513

(22) Filed: Feb. 10, 2021

(65) Prior Publication Data

US 2022/0191306 A1 Jun. 16, 2022

Related U.S. Application Data

(60) Provisional application No. 63/124,597, filed on Dec. 11, 2020.

(51) Int. Cl.
*H04L 29/06* (2006.01)
*H04L 12/805* (2013.01)
(Continued)

(52) U.S. Cl.
CPC ............ *H04L 69/163* (2013.01); *G06F 3/067* (2013.01); *G06F 3/0613* (2013.01);
(Continued)

(58) Field of Classification Search
CPC ....... H04L 69/163; H04L 47/36; H04L 67/32; H04L 69/22; H04L 69/28; H04L 1/1848;
(Continued)

(56) References Cited

U.S. PATENT DOCUMENTS 8,549,152 B2 10/2013 Elzur et al.
9,674,090 B2 6/2017 Caulfield et al.
(Continued)

FOREIGN PATENT DOCUMENTS

CN 109684029 A 4/2019

OTHER PUBLICATIONS

Mellanox, An Introduction to SmartNICs, Mar. 4, 2019, URL retrieved via: https://www.nextplatform.com/2019/03/04/an-introduction-to-smartnics/ (Year: 2019).*
(Continued)

*Primary Examiner* — Schquita D Goodwin
(74) *Attorney, Agent, or Firm* — Barry IP Law, P.C.

(57) ABSTRACT

A programmable network interface for a server includes at least one memory storing connection parameters for previously active Non-Volatile Memory express over Fabric (NVMeoF) connections with different NVMe nodes. An NVMeoF connection request is received from an NVMe node, and it is determined whether the NVMe node is associated with connection parameters stored in the at least one memory. In response to determining that the NVMe node is associated with connection parameters stored in the at least one memory, a new NVMeoF connection is established for communicating with the NVMe node using the stored connection parameters. In one aspect, an address space of the server is partitioned, and an NVMe request queue is assigned to each partition of the address space. At least one address is identified in a received NVMeoF message, and an NVMe request queue is determined for performing an NVMe request included in the NVMeoF message.

20 Claims, 7 Drawing Sheets

(51) Int. Cl.
| | |
|---|---|
| *H04L 29/08* | (2006.01) |
| *H04L 69/163* | (2022.01) |
| *H04L 69/22* | (2022.01) |
| *H04L 47/36* | (2022.01) |
| *H04L 69/28* | (2022.01) |
| *G06F 3/06* | (2006.01) |
| *H04L 67/60* | (2022.01) |
| *H04L 1/18* | (2006.01) |

(52) U.S. Cl.
CPC ............ *G06F 3/0679* (2013.01); *H04L 47/36* (2013.01); *H04L 67/60* (2022.05); *H04L 69/22* (2013.01); *H04L 69/28* (2013.01); *G06F 3/0635* (2013.01); *H04L 1/1848* (2013.01)

(58) Field of Classification Search
CPC ...... G06F 3/0613; G06F 3/067; G06F 3/0679; G06F 3/0635
USPC ......................................................... 709/230
See application file for complete search history.

(56) References Cited

U.S. PATENT DOCUMENTS

| | | | |
|---|---|---|---|
| 9,971,519 | B2 | 5/2018 | Romem et al. |
| 2016/0127493 | A1 | 5/2016 | Shalom et al. |
| 2018/0074717 | A1 | 3/2018 | Olarig et al. |
| 2019/0042144 | A1* | 2/2019 | Peterson ................. G06F 3/061 |
| 2019/0121350 | A1* | 4/2019 | Celia .................. G05B 23/0264 |
| 2019/0306083 | A1* | 10/2019 | Shih ...................... G06F 13/4022 |
| 2020/0136996 | A1 | 4/2020 | Li et al. |
| 2020/0159421 | A1* | 5/2020 | Karumbunathan ... G06F 3/0619 |
| 2020/0259799 | A1* | 8/2020 | Li ........................... H04L 9/0897 |
| 2020/0319812 | A1* | 10/2020 | He ......................... G06F 3/0604 |
| 2021/0286741 | A1* | 9/2021 | Smith .................. G06F 13/1668 |
| 2022/0100412 | A1* | 3/2022 | Martin ................... G06F 3/0679 |
| 2022/0103629 | A1* | 3/2022 | Cherian ................. H04L 67/12 |

OTHER PUBLICATIONS

NVM Express, What is NVMe®?, Dec. 1, 2020, URL retrieved via: https://nvmexpress.org/ (Year: 2020).*

Durner et al.; "HNLB: Utilizing Hardware Matching Capabilities of NICs for Offloading Stateful Load Balancers"; ICC 2019-2019 IEEE International Conference on Communications, May 20, 2019; pp. 1-7; available at https://arxiv.org/abs/1902.03430.

Mellanox Technologies; Mellanox Propels NVMe/TCP and RoCE Fabrics to New Heights; Oct. 15, 2019; 4 pages; available at: https://www.businesswire.com/news/home/20191015005339/en/Mellanox-Propels-NVMeTCP-RoCE-Fabrics-New-Heights.

Moon et al.; "Accelerating Flow Processing Middleboxes with Programmable NICs"; Proceedings of the 9th Asia-Pacific Workshop on Systems; Aug. 27, 2018; pp. 1-3; available at https://www.ndsl.kaist.edu/~ygmoon/apsys18-moon.pdf.

International Search Report and Written Opinion dated Oct. 21, 2021 from counterpart International Application No. PCT/US2021/039087, 9 pages.

* cited by examiner

PACKET PROCESSING BY PROGRAMMABLE NETWORK INTERFACE

CROSS-REFERENCE TO RELATED APPLICATION

This application claims the benefit of U.S. Provisional Application No. 63/124,597 entitled "PACKET PROCESSING BY PROGRAMMABLE NETWORK INTERFACE", filed on Dec. 11, 2020, which is hereby incorporated by reference in its entirety.

BACKGROUND

Current trends in cloud computing, big data, and Input/Output (I/O) intensive applications have led to greater needs for high performance distributed shared memory systems in data centers in terms of low latency, high throughput, and bandwidth. Emerging high-performance Non-Volatile Memory express (NVMe®) storage devices, such as Solid State Drives (SSDs), are becoming more common due to their increased performance in terms of Input/Output Operations Per Second (IOPS). Although NVMe was originally designed as an interface specification to be used with a Peripheral Component Interconnect express (PCIe) interface within a computer system, recent NVMe extensions such as NVMe over Fabric (NVMeoF) can support remote access to NVMe devices, such as with Remote Direct Memory Access (RDMA) (e.g., RDMA over Converged Ethernet (RoCE) and iWarp) and Fibre Channel (FC) transport fabrics.

Although both RoCe and iWARP support high-performance, they need RDMA enabled devices and expensive Data Center Bridging (DCB) capable switches that may not be readily available and can limit scalability. NVMeoF using Transmission Control Protocol (TCP), on the other hand, allows for NVMe to run over existing Ethernet networks in data centers using the most prevalent transport protocol. However, the efficiency of such NVMeoF systems using TCP depends on the performance of the TCP stack. In this regard, TCP packet processing can be processor intensive, which leads to a large performance penalty resulting in greater latency and lower throughput. While network bandwidth continues to increase, inefficiencies of standard network interfaces (e.g., Network Interface Cards (NICs)) for network processing limits data center memory and compute performance.

In fact, kernel space TCP stack operation consumes most of the Central Processing Unit (CPU) cycles for stateful TCP operations and connection arrangements. This can cause significant processing overhead and performance reduction, especially for relatively short-lived connections, and for latency-sensitive flows of only a few packets (e.g., "bursty mice flows") that are common in data centers.

In some cases, kernel bypass may be used to transfer packet processing from a kernel space of the server to an application executing in the user space of the server. However, kernel bypass generally still cannot keep up with modern Ethernet speeds, such as 100 Gbps or 200 Gbps, or support per-flow resource allocation requirements of today's data centers. The main reason for such limited TCP performance improvement despite the use of kernel bypass is due to the overhead of complex protocol operations to maintain protocol specifications. There are also some efforts to offload some basic operations from a processor of the server, such as checksum processing and packet segmentation, however, the kernel's TCP stack processing is typically still a performance bottleneck. Moreover, these approaches do not provide flexible operational offloading of performance related packet processing operations. In particular, these approaches do not support quick adaptation to the evolution of the different protocols, and the changing requirements of applications executed by nodes in today's data centers.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
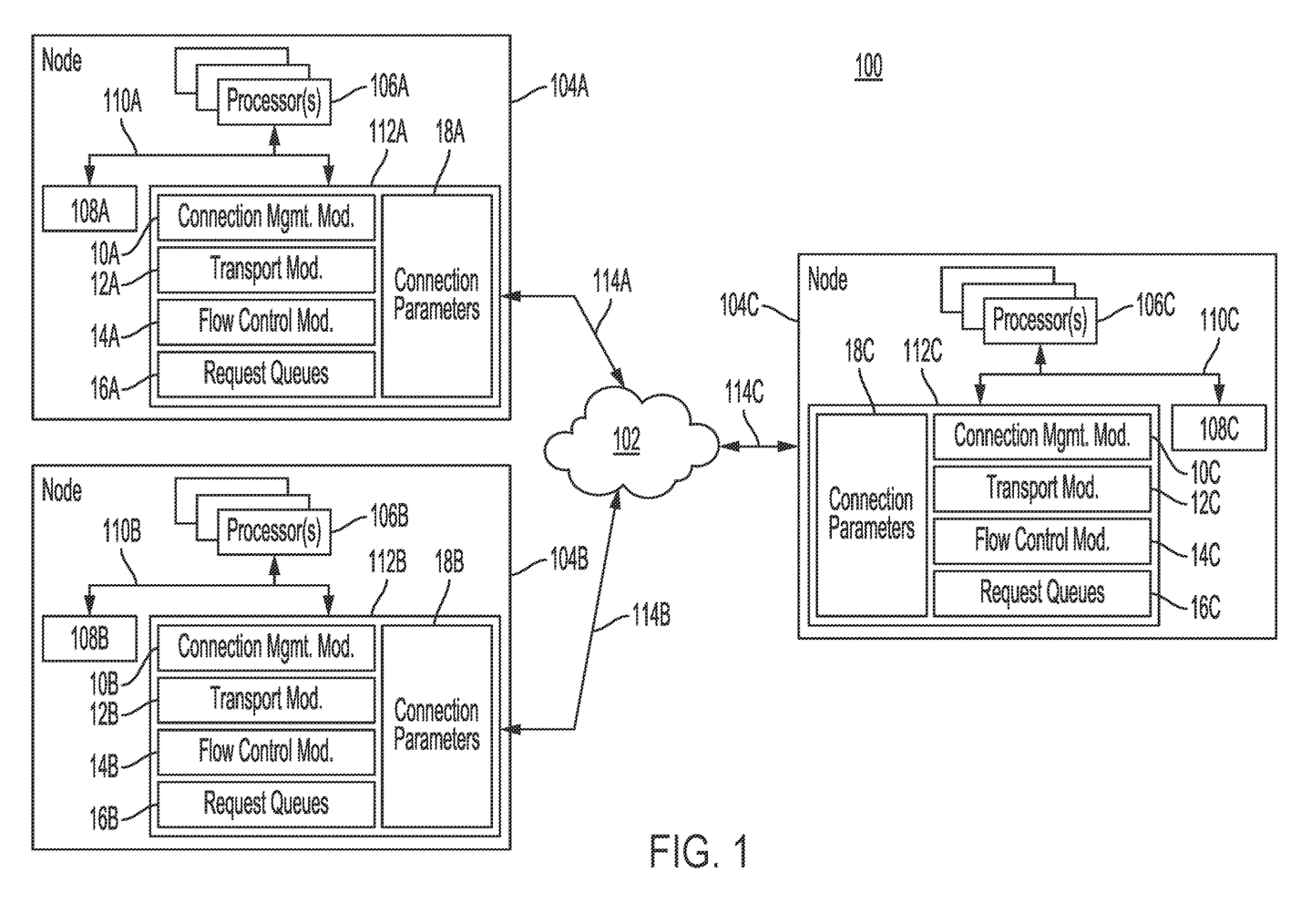
FIG. 1 illustrates an example network environment for implementing packet processing offloading according to one or more embodiments.

FIG. 1 illustrates an example network environment 100 for implementing packet processing offloading according to one or more embodiments. As shown in FIG. 1, nodes 104A, 104B, and 104C communicate with each other via network 102. Nodes 104 can include, for example, servers that may function as processing nodes that include one or more processors, such as Reduced Instruction Set Computer (RISC)-V cores, and/or as memory nodes, that include one or more Solid-State Drives (SSDs) or Hard Disk Drives (HDDs). In some implementations, network environment 100 in FIG. 1 may be used as at least part of a data center and/or for distributed processing, such as for distributed machine learning or big data analysis. As will be appreciated by those of ordinary skill in the art, nodes 104 are shown for the purposes of illustration, and network environment 100 can include many more nodes than those shown in FIG. 1. In addition, those of ordinary skill the art will appreciate that network environment 100 can include more components than shown in FIG. 1, such as aggregated switches, Top of Rack (ToR) switches, and network controllers, for example.

Nodes 104 communicate with each other via network 102. Network 102 can include, for example, a Storage Area Network (SAN), a Local Area Network (LAN), and/or a Wide Area Network (WAN), such as the Internet. In this regard, nodes 104A, 104B, and 104C may not be in the same geographic location. Nodes 104 may communicate using one or more standards such as, for example, Ethernet. In this regard, connections 114A, 114B, and 114C connect programmable network interfaces 112A, 112B, and 112C, respectively, to network 102. Programmable network interfaces 112 can include one or more Ethernet ports for a connection 114.

Each of nodes 104 includes one or more processors 106, a memory 108, and a programmable network interface 112. These components of nodes 104 may communicate with each other via a bus 110, which can include, for example, a Peripheral Component Interconnect express (PCIe) bus. Nodes 104 may be referred to herein as Non-Volatile Memory express over Fabric (NVMeoF) nodes in that nodes 104 are configured to communicate with other nodes 104 using NVMe messages (e.g., NVMe commands and responses) that may be encapsulated in Ethernet packets using Transmission Control Protocol (TCP).

Processors 106 can execute instructions, such as instructions from an application executing in a user space of a node 104, or as part of an Operating System (OS) used by the node 104. Processors 106 can include circuitry such as, for example, a Central Processing Unit (CPU), a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 can include a System on a Chip (SoC), which may be combined with a memory 108.

Memories 108 can include, for example, a volatile Random Access Memory (RAM) such as Static RAM (SRAM), Dynamic RAM (DRAM), a non-volatile RAM, or other solid-state memory that is used by processor or processors 106. Data stored in memory 108 can include data read from another node 104, data to be stored in another node 104, instructions loaded from an application for execution by a processor 106, and/or data used in executing such applications.

In some implementations, memory 108 can include, for example, one or more rotating magnetic disks, or non-volatile solid-state memory, such as flash memory. In such implementations, memory 108 may include one or more storage devices such as one or more SSDs and/or HDDs. While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 108 may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Programmable network interfaces 112 can include devices such as smart Network Interface Cards (NICs), network interface controllers, or network adapters that can be programmed using a programming language, such as P4. For example, programmable network interfaces 112 can include smart NICs, such as a Netronome Agilio NIC, a Mellanox Bluefield NIC, or a Broadcom Stingray NIC. As shown in FIG. 1, each programmable network interface 112 stores connection management module 10, transport module 12, flow control module 14, request queues 16, and connection parameters 18.

As discussed in more detail below, connection management module 10, transport module 12, and flow control module 14 can enable NVMe and TCP processing offload from processors 106 to hardware of programmable network interface 112. Such offloading can allow for higher performance of nodes 104 in terms of reducing memory access latency and increasing throughput. Request queues 16 can allow for queuing of NVMe requests or commands to be performed in different partitions of an accessible address space of the node 104. The address space can represent an amount of storage or memory at the node 104, such as in memory 108, that is available to be accessed by other nodes 104.

In addition, programmable network interfaces 112 store connection parameters 18, which include connection parameters for previously active connections with different nodes 104. Such connection parameters can include, for example, indications of a connection state, negotiated parameters between the nodes 104 during a previously active connection, packet sequence numbers, and/or retransmission timeout values for resending a message in case an acknowledgment is not received from the other node 104. The negotiated parameters can include, for example, a protocol version used for the previously active connection, a data offset alignment from the start of a Protocol Data Unit (PDU) used in NVMe, a bitmask used for the header or data digest for ensuring data integrity, a maximum data length, a permission level (e.g., read only, read/write permission), and/or a maximum number of credits allowed for flow control. As discussed in more detail below, the storage of connection parameters 18 at programmable network interfaces 112 can shorten the time needed to establish a new connection between nodes by reusing the stored connection parameters from previously active connections between the same nodes 104. In some implementations, connection parameters for connections that are less recent and/or less frequent may be removed to free up space in connection parameters 18 for connection parameters of more recent connections and/or more frequent connections.

Those of ordinary skill in the art will appreciate with reference to the present disclosure that other implementations may include a different number or arrangement of nodes 104 than shown in the example of FIG. 1. In this regard, network environment 100 shown in FIG. 1 is for the purposes of illustration, and those of ordinary skill in the art will appreciate that network environment 100 may include many more nodes 104, and additional components, such as routers and switches, than shown in the example of FIG. 1.

Figure 2:
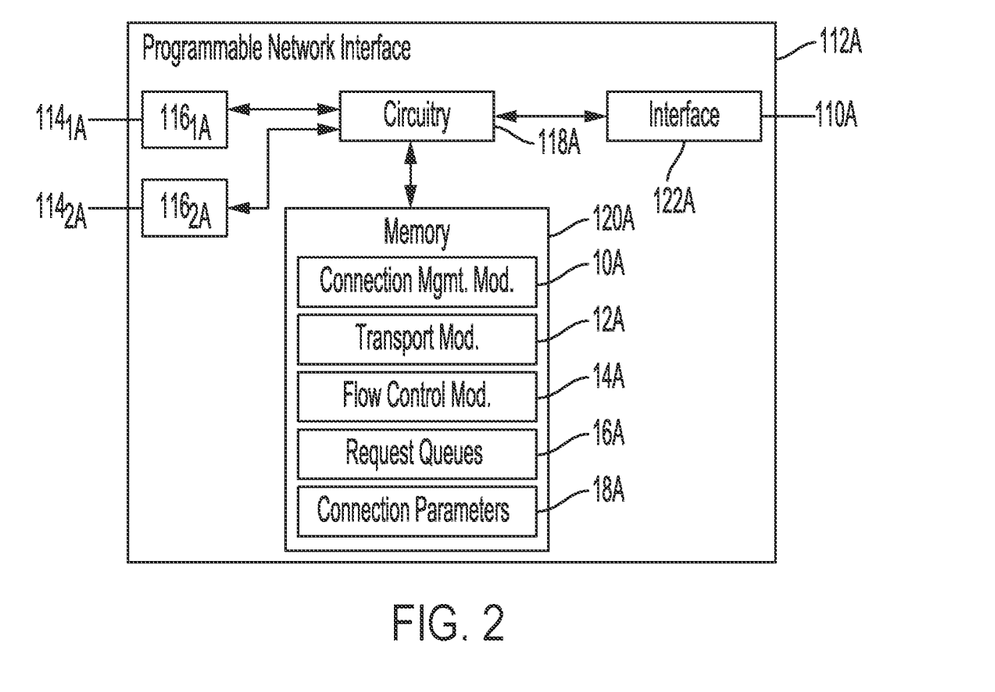
FIG. 2 is a block diagram of example components included in a programmable network interface according to one or more embodiments.

FIG. 2 is a block diagram of example components included in programmable network interface 112A according to one or more embodiments. As shown in FIG. 2, programmable network interface 112A includes ports $116_{1A}$ and $116_{2A}$, circuitry 118A, memory 120A, and interface 122A.

Ports $116_{1A}$ and $116_{2A}$ allow programmable network interface 112A to communicate with other nodes 104 via connections 114₁,₄ and 114₂,₄, respectively. In other implementations, programmable network interface 112A may include a different number of ports 116, such as a single port 116.

Circuitry 118A can execute instructions, such as instructions from connection management module 10A, transport module 12A, and flow control module 14A. Connection management module 10A, transport module 12A, and flow control module 14A can include a firmware of programmable network interface 112A and/or field-programmable instructions. As noted above, programmable network interface 112A can be programmed in the field using a programming language, such as P4. This can allow for programmable network interface 112A to adapt to new versions of the protocols used in network environment 100 and/or changing requirements, such as a minimum Quality of Service (QoS), for applications executed by nodes 104. Circuitry 118A can include circuitry such as, for example, a microcontroller, a DSP, an ASIC, an FPGA, a multi-core processor, hard-wired logic, analog circuitry and/or a combination thereof. In some implementations, circuitry 118A can include an SoC, which may be combined with memory 120A or other memory, such as DRAM.

Memory 120A can include, for example, Content Addressable Memory (CAM) or Ternary CAM (TCAM) tables, or other types of match-action tables, that can ordinarily provide faster processing of messages than in conventional network interfaces (e.g., NICs), such as at a line rate or near line rate. In some implementations, the CAM or TCAM tables can be stored in registers, such as SRAM register arrays. In other implementations, memory 120A can include solid-state memory, such as flash memory or SCM. As shown in FIG. 2, memory 120A stores connection management module 10A, transport module 12A, flow control module 14A, request queues 16A, and connection parameters 18A.

Connection management module 10A is responsible for NVMeoF/TCP connection setup, connection maintenance, and connection teardown. As discussed in more detail below with reference to FIG. 4, programmable network interface 112A can exchange connection management messages with the programmable network interface 112 of another node 104 (e.g., programmable network interface 112B in FIG. 1) to establish an NVMeoF/TCP connection, and then notify one or more processors 106A of node 104A that the connection has been established. After receiving a disconnection request by the node or from one or more processors 106A executing an application, connection management module 10A performs an NVMeoF/TCP connection teardown.

In addition, connection management module 10A of programmable network interface 112A may also be responsible for discovering and identifying NVMe subsystems or NVMe nodes 104 that node 104 may access. The NVMe discovery can include identifying paths for communicating with each discovered NVMe subsystem and NVMe node 104. In some implementations, programmable network interface 112A using connection management module 10A may broadcast discovery messages during initialization of node 104A. Every NVMe node 104 that receives the discovery message can reply with its available NVMe subsystem information (e.g., NVMe-subsystem names and addresses). Connection management module 10A then creates a data structure in a memory of programmable network interface 112A (e.g., memory 120A) including information for node 104A to connect to different NVMe subsystems based on the information collected from the other NVMe nodes 104.

Transport module 12A is responsible for data and command transfer between nodes 104 during NVMe read and write operations. This can include identifying a NVMe command encapsulated in an incoming NVMeoF/TCP packet, discarding Ethernet, TCP, and/or NVMe headers, and only sending an operation code and required parameters to a request queue of request queues 18A based on at least one address identified by transport module 12A for the command. In other words, transport module 12A can translate NVMeoF/TCP packets to actual read and write commands for being performed by one or more processors 106A of node 104A.

In addition, transport module 12A may maintain a data structure indicating the state of individual running transactions (i.e., each pending NVMe command sent between to a target node or received from an initiator node) in memory 120A. In some implementations, and as discussed in more detail below with reference to the example of a fragmented NVMeoF write transaction in FIG. 5, transport module 12A can segment or fragment large NVMeoF/TCP data transfers where the NVMe PDU is larger than a network Maximum Transmission Unit (MTU), such as 1,500 bytes.

Flow control module 16A is responsible for load balancing, congestion control, controlling NVMe retransmission timeout values, and NVMe capsule retransmission. In some implementations, flow control module 16A partitions the address space of memory of node 104A that is accessible by other nodes 104 (e.g., some or all of an address space of memory 108A in FIG. 1), and assigns an NVMe request queue to each partition of the address space to form request queues 18A. NVMe requests or commands are then directed to the appropriate queue based on at least one address included in an NVMeoF message for the NVMe request or command. Flow control module 16A may also balance the queues by setting different weights or a number of requests to perform per queue in a given cycle, such as in a round robin algorithm. The weights or number of requests may also depend on application performance requirements (e.g., a minimum QoS) and/or a priority indicated for an NVMe request, such as through the use of an 802.1Qbb priority tag included in the packet.

In addition, flow control module 14A may use a credit-based system to help ensure enough buffer space for receiving NVMe commands and data capsules. For example, programmable network interface 112A using flow control module 14A may send to an initiator node 104 an indication of a number of credits for sending messages to node 104A based on an available capacity of an NVMe request queue being used by the initiator. The initiator node 104 then decreases the number of its credits, such as by one, each time the node sends an NVMeoF message to node 104A. The credits may be increased in response to node 104A returning a new indication of the credits to the other node 104.

Flow control module 14A may also identify network congestion using an Explicit Congestion Notification (ECN) bit in one or more packets. In response to the ECN bit having been set, programmable network interface 112A can notify the sender in the next acknowledgment packet to adjust its transmission rate.

To support reliable NVMe capsule delivery, flow control module 14A can use a selective acknowledgment and timeout retransmission approach. Upon reception of a packet, flow control module 14A may compare a packet sequence number of the received packet with the expected packet sequence number for that data flow or active connection. If the sequence number of the received packet matches the expected sequence number, the packet is further processed by programmable network interface 112A and an acknowledgment (i.e., ACK) is returned to the sender. Otherwise, programmable network interface 112A sends a negative-acknowledgment (i.e., NACK) or other error message including the sequence number of the last packet received by node 104A.

Flow control module 14A can also retransmit a packet in cases where programmable network interface 112A receives a negative acknowledgment or if an acknowledgment is not received within a period of time, such as a Retransmission Timeout Period (RTO), represented by a timeout value. In some implementations, flow control module 14A can set a timeout register responsive to sending a message, such as by an egress pipeline of programmable network interface 112A, for receiving a corresponding acknowledgment. The timeout value can be based on, for example, an average roundtrip packet transmission duration. In some implementations, the timeout value may be adjusted in the field based on, for example, an exponential moving average of sampled round trip times.

Interface 122A provides an interface to the internal bus 110A of node 104A, as shown in FIG. 1. In some implementations, interface 122A may provide a PCIe interface or PCIe switching for communication with other components of node 104A, such as with one or more processors 106A and memory 108A in FIG. 1.

As will be appreciated by those of ordinary skill in the art with reference to the present disclosure, the arrangement or number of components for programmable network interface 112A may differ from FIG. 2. For example, other implementations of programmable network interface 112A may include a different number of memories 120A, interfaces 122A, or a different number of ports 116.

Figure 3:
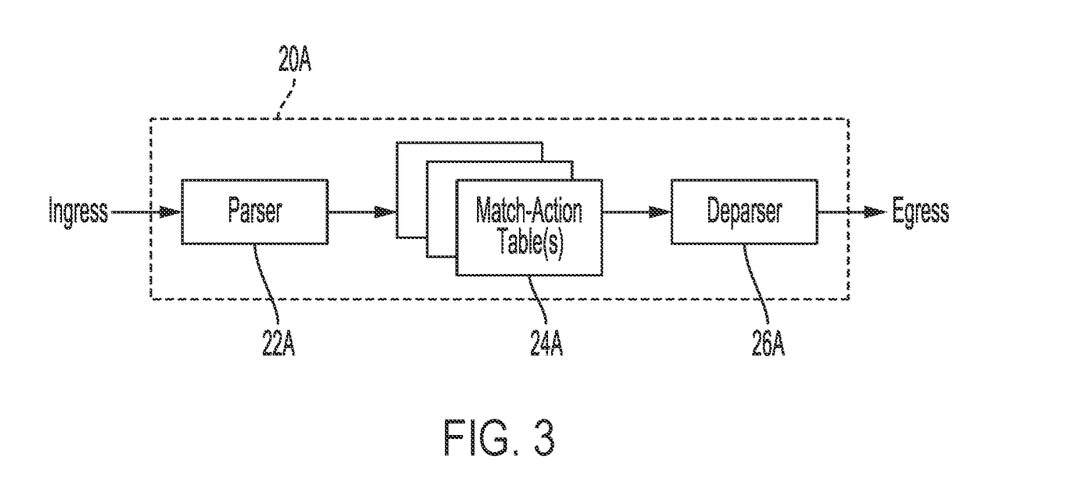
FIG. 3 is an example programmable pipeline of a programmable network interface according to one or more embodiments.

FIG. 3 is an example programmable pipeline 20A of programmable network interface 112A according to one or more embodiments. The use of a programmable pipeline in a programmable network interface of a node can allow for efficiently offloading tasks that would conventionally be performed through virtualization or by a driver, such as an NVMe driver, executed by a processor of the node. Such hardware-based offloading of NVMeoF/TCP processing from one or more processors of the node to a programmable network interface can ordinarily improve the throughput and reduce latency to better take advantage NVMeoF and modern Ethernet speeds. In some implementations, each port of the programmable network interface, such as each of ports $116_{1A}$ and $116_{2A}$, can have its own programmable pipeline 20A for processing packets received by the port at a line rate or near line rate.

As shown in the example of FIG. 3, programmable pipeline 20A includes parser 22A, one or more match-action tables 24A, and deparser 26A. In the example of FIG. 3, ingress packets are received by parser 22A, which extracts headers from the packets to perform match-action operations or stages using one or more match-action tables 24A. Each match-action table 24A may be customized to perform a matching operation on an extracted value or values from a packet according to predefined rules, and then execute actions, such as, for example, adding, removing, or modifying fields of the headers, routing an NVMe request to an appropriate queue 18 based on an extracted address and/or priority indicator, or sending a connection management response, such as a message to adjust a transmission rate due to an extracted ECN bit, a message to establish a connection, or a message to terminate an active connection. Deparser 26A can assemble a packet in response to the received packet, such as, for example, an acknowledgment (ACK message), error message (e.g., a NACK message), or other notification, such as a notification to adjust a transmission rate or a number of available credits for a flow control, without involving other components of the node 104A outside of programmable network interface 112A (e.g., one or more processors 106A in FIG. 1).

Example Processes

Figure 4:
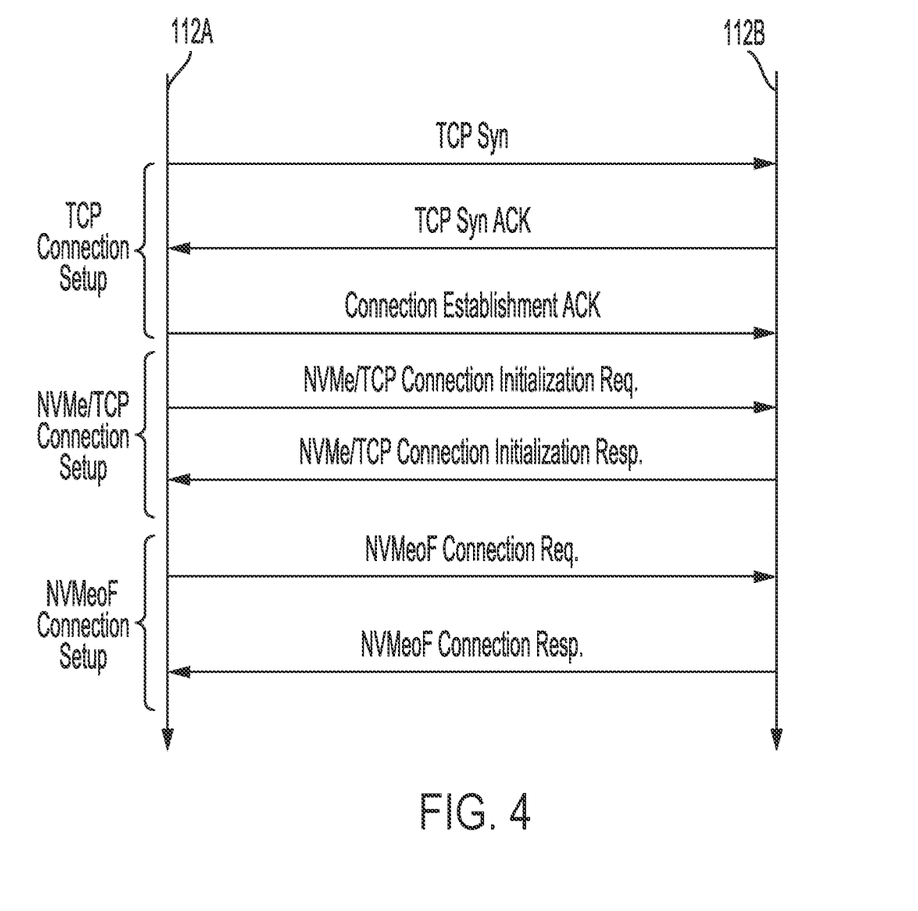
FIG. 4 is an example Non-Volatile Memory express over Fabric (NVMeoF)/Transmission Control Protocol (TCP) connection setup according to one or more embodiments.

FIG. 4 is an example NVMeoF/TCP connection setup between nodes 104A and 104B according to one or more embodiments. As shown in FIG. 4, the connection setup can be performed by programmable network interfaces 112A and 112B of nodes 104A and 104B executing connection management modules 10A and 10B, respectively. In some implementations, nearly all of the communications exchanged between the programmable network interfaces 112A and 112B can be performed by respective programmable pipelines, such as programmable pipeline 20A discussed above, with minimal involvement of other components of nodes 104A and 104B, which improves the speed at which the NVMeoF/TCP connection can be set up.

As shown in FIG. 4, the connection setup may begin with a TCP three-way handshake with programmable network interface 112A sending a TCP synchronization packet (i.e., TCP Syn) to programmable network interface 112B, which may include a sequence number. In response, programmable network interface 112B returns a TCP synchronization packet with its acknowledgment of the TCP synchronization packet (i.e., TCP Syn ACK) received from programmable network interface 112A, such as by incrementing the received sequence number, and providing its own sequence number to programmable network interface 112A. The connection establishment acknowledgment (i.e., ACK) may, for example, increment the sequence number provided by programmable network interface 112B.

Programmable network interface 112A then performs an NVMe/TCP connection setup by sending an NVMe/TCP connection initialization request to programmable network interface 112B. This can include a PDU sent from programmable network interface 112A to provide NVMe/TCP connection parameters, such as features supported by node 104A and/or parameters to be negotiated between programmable network interfaces 112A and 112B.

Such negotiated parameters can include, for example, a protocol version to be used, a data offset to be used in PDUs, a bitmask used for headers or a data digest to ensure the integrity of the PDUs, and a maximum data length to be used for each PDU. In response, programmable network interface 112B returns an NVMe/TCP connection initialization response, which may acknowledge the features and/or parameters proposed by programmable network interface 112A, and may include additional information, such as a maximum number of credits that may be used by programmable network interface 112A for sending messages. As noted above, a flow control module of programmable network interface 112B may set the maximum number of credits based on a buffer or queue size of programmable network interface 112B.

After establishing an NVMe/TCP connection, programmable network interface 112A establishes an NVMeoF connection by sending an NVMeoF connection request. The NVMeoF connection request can include, for example, information for an NVMeoF binding, such as restrictions on certain capabilities (e.g., Scatter Gather List (SGL) descriptors for large data transfers, data placement restrictions, data transport capabilities, and authentication capabilities). The NVMeoF connection request can also include, for example, information on queues used by programmable network controller 112A, such as a sizing and number of queues. A processor 106A of node 104A that requested the connection can be notified by programmable network interface 112A that the connection has been established, so that the command can be transmitted to the node 104*b* after the NVMeoF/TCP connection has been established by programmable network interface 112A. The processor 106A may request the connection by, for example, executing an application that requests data stored in an NVMe namespace of node 104*b* or that requests to write data in an NVMe namespace of node 104B.

As discussed above, the use of programmable network interfaces to establish an NVMeoF/TCP connection can significantly reduce the amount of time needed to establish the NVMeoF/TCP connection between nodes 104A and 104B, while also offloading such processing from processors 106 to further improve performance of nodes 104. Similarly, connection management module 10 may also be used for an NVMeoF/TCP connection teardown. In such cases, the programmable network interface 112 can receive a disconnection request from the other NVMe node or from an application executing at the node 104, and send a completion message to the other NVMe node without involving other components of the node 104. A notification may then be provided to a processor 106 of the node 104 indicating that the connection is no longer active.

In addition, programmable network interfaces 112A and 112B may retain parameters for the connection after termination of the connection. Such parameters may be stored as part of connection parameters 18 to facilitate faster connection establishment for future NVMeoF/TCP connections between programmable network interfaces 112A and 112B. In this regard, some or all of the NVMe/TCP connection setup and the NVMeoF connection setup in FIG. 4 may be skipped if connection parameters stored in connection parameters 18 can be identified for the other NVMe node including the other programmable network interface.

With reference to the sequence of FIG. 4, programmable network interface 112B may use connection parameters 18A to preemptively send an NVMe/TCP connection initialization response confirming the connection parameters used from a last active connection with programmable network interface 112A, and may also preemptively send an NVMeoF connection response confirming other connection parameters used from the last active connection with programmable network interface 112A. As discussed below in more detail with reference to the connection setup process of FIG. 6, reusing stored connection parameters from a previous connection with the same node can ordinarily reduce the time and processing needed to establish an NVMeoF/TCP connection.

Figure 5:
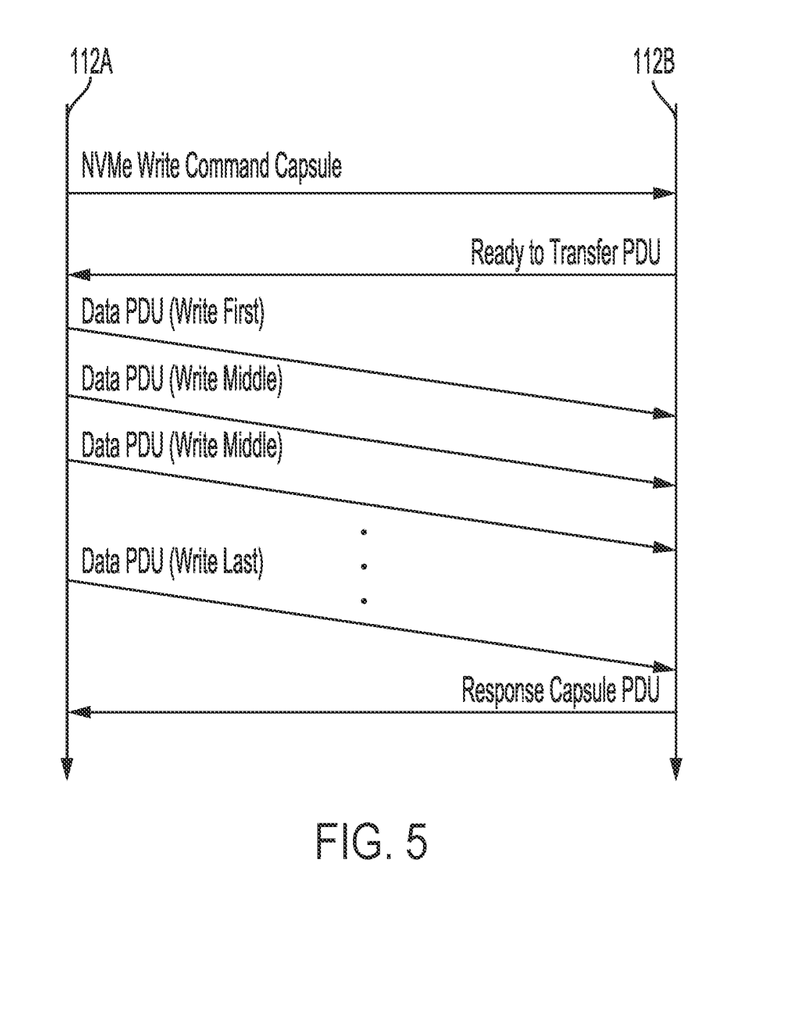
FIG. 5 is an example NVMeoF write transaction according to one or more embodiments.

FIG. 5 is an example NVMeoF write transaction that is fragmented according to one or more embodiments. As shown in FIG. 5, programmable network interface 112A can fragment data received from a processor of node 104A (i.e., processor 106A) to fit within a network MTU. The fragmented write sequence of FIG. 5 can be performed primarily by programmable network interfaces 112A and 112B of nodes 104A and 104B executing transport modules 12A and 12B, respectively. In some implementations, nearly all of the communications exchanged between the programmable network interfaces 112A and 112B in FIG. 5 can be performed by respective programmable pipelines, such as programmable pipeline 20A discussed above, with little involvement of other components of nodes 104A and 104B, which improves the speed at which large data transfers (i.e., larger than an MTU) can take place.

Programmable network interface 112A begins by sending an NVMe write command capsule in a PDU after an NVMeoF/TCP connection has been established, as in the sequence of FIG. 4 discussed above or by using connection parameters 18, as discussed in more detail below with reference to the NVMeoF/TCP connection setup process of FIG. 6. The NVMe write command capsule sent from programmable network interface 112A in FIG. 5 includes an NVMe write command.

In response to receiving the NVMe write command capsule, programmable network interface 112B returns a ready to transfer PDU. As noted above, programmable controller 112B via connection management module 10A may have provided programmable network interface 112A with a maximum number of credits for a number of messages or PDUs that can be sent before receiving an acknowledgment from programmable network interface 112B. In other implementations, the ready to transfer PDU may include a number of credits tailored to a specific queue assigned to the portion of address space that the write command will be performed in, which can be indicated by one or more addresses included in the initial NVMe write command capsule.

Programmable network interface 112A then fragments data it has received from a processor of the node (e.g., a processor 106A in FIG. 1) and packages the data to be written into a series of data PDUs. In this regard, transport module 12A may provide each PDU with a sequence number to ensure that the data is received in the correct order. Transport module 12A may include an indicator or flag in the last data PDU to indicate that the transfer is complete.

After receiving the last data PDU, programmable network interface 112B returns a response capsule PDU to programmable network interface 112A indicating that all of the data PDUs have been received. In this regard, transport module 12B executed by programmable network interface 112B may include an indication or flag in the response capsule PDU to indicate the receipt of all of the data PDUs in the correct sequence. In other implementations, the response capsule PDU may be omitted such that it is assumed by programmable network interface 112A that all data PDUs were successfully received in the correct order unless an error message or NACK is received from programmable network interface 112B.

In some implementations, transport module 12B may send an error message or NACK responsive to the data PDUs not being received in the correct order. In such cases, and as discussed in more detail below with reference to the example message retransmission process of FIG. 8, transport module 12A of programmable network interface 112A may resend the out-of-order or missing data PDU with minimal involvement of other components of node 104A, such by a processor 106A of node 104A.

During the active connection between the nodes or the active communication session, each programmable network interface 112 may, in some implementations keep track of a current state for each transaction where a command has been sent to or received by another NVMe node. Such information may be stored in a different data structure from connection parameters 18 or in the same data structure in some implementations.

As discussed above, the use of programmable network interfaces, such as programmable network interfaces 112A and 112B, can significantly reduce the amount of time needed to transfer data using NVMeoF/TCP between nodes 104A and 104B, while also offloading such processing from processors 106 to further improve performance of nodes 104.

Figure 6:
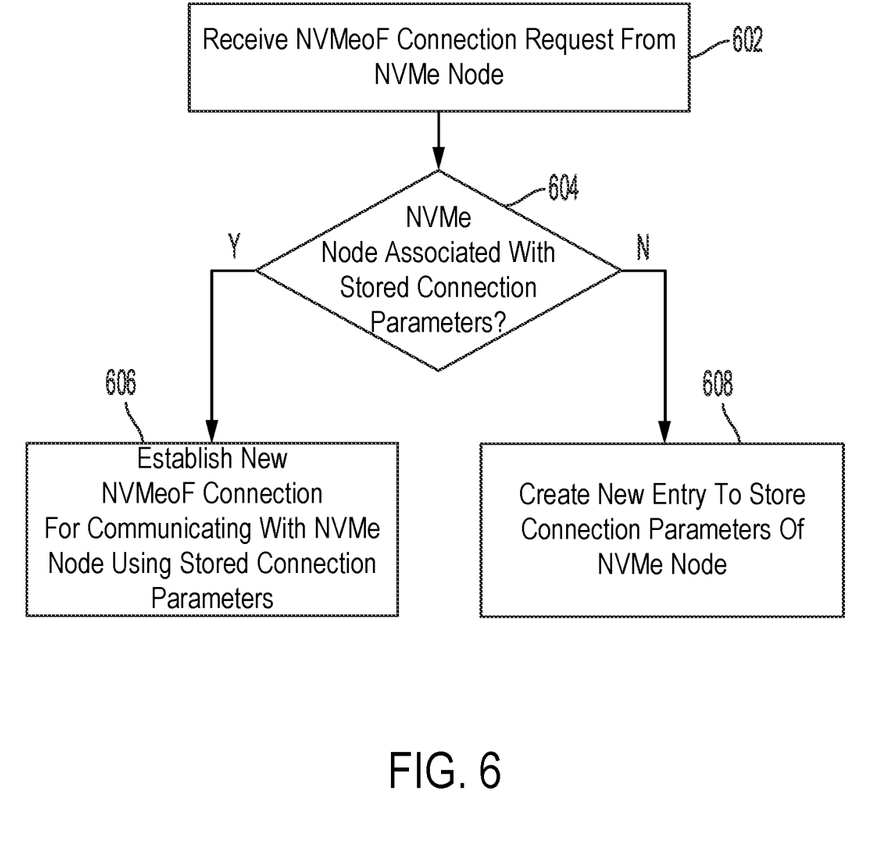
FIG. 6 is a flowchart for an NVMeoF/TCP connection setup process according to one or more embodiments.

FIG. 6 is a flowchart for an NVMeoF/TCP connection setup process according to one or more embodiments. The process of FIG. 6 can be performed by, for example, circuitry 118 of a programmable network interface 112 executing connection management module 10.

In block 602, the programmable network interface receives an NVMeoF connection request from an NVMe node, such as from another node 104 in FIG. 1. In some implementations, the connection request can follow, for example, a TCP connection setup and/or NVMe/TCP connection setup, as in the example connection sequence shown in FIG. 4.

In block 604, the programmable network interface determines whether the NVMe node is associated with connection parameters stored in connection parameters 18. In some implementations, an NVMe namespace ID or other identifier may be used to determine whether there is an entry or connection parameters associated with the NVMe node. As noted above, the programmable network interface can locally store parameters for previous NVMeoF/TCP connections, such as, for example, indications of a connection state, negotiated parameters between the programmable network interfaces 112 during a previously active connection, packet sequence numbers, and/or retransmission timeout values for resending a message in the event an acknowledgment is not received from the other node 104. The negotiated parameters can include, for example, a protocol version used for the previously active connection, a data offset alignment from the start of the PDU, a bitmask used for the header, a maximum data length, a permission level (e.g., read only, read/write permission), and/or a maximum number of credits allowed for flow control.

In response to determining in block 604 that the NVMe node is associated with connection parameters stored in connection parameters 18, a new NVMeoF connection is established in block 606 for communicating with the NVMe node using the stored connection parameters. As noted above with reference to the connection establishment sequence of FIG. 4, most of the NVMe/TCP connection setup and NVMeoF connection setup can be substituted for the stored connection parameters associated with the NVMe node. In some implementations, the programmable network interface 112 may send a confirmation of the stored parameters, but even in such cases, the other NVMe node may not need to send its NVMe/TCP connection initialization request and/or NVMeoF connection request, which can reduce the amount of processing needed for establishing an NVMeoF/TCP connection.

On the other hand, in response to determining in block 604 that the NVMe node is not associated with connection parameters stored in connection parameters 18, the programmable network interface in block 608 creates a new entry or entries in connection parameters 18 to store the connection parameters for the other NVMe node. The connection parameters for the other NVMe node may be stored after establishing an NVMeoF/TCP connection, such as after the connection establishment sequence of FIG. 4 discussed above, for example. As noted above, in some implementations, the storage of connection parameters may be subject to available storage space, such that connection parameters for only the most recent and/or most frequently used connections are stored or retained in connection parameters 18. In this regard, connection parameters 18 may also include a last active time and/or a usage indicator for the established connection, which may be used for determining whether to remove connection parameters for less recently used and/or less frequently used connections.

As noted above, the storage of connection parameters 18 at programmable network interfaces 112 can shorten the time needed to establish a new NVMeoF/TCP connection between nodes by reusing the stored connection parameters from previously active connections between the same nodes 104.

Figure 7:
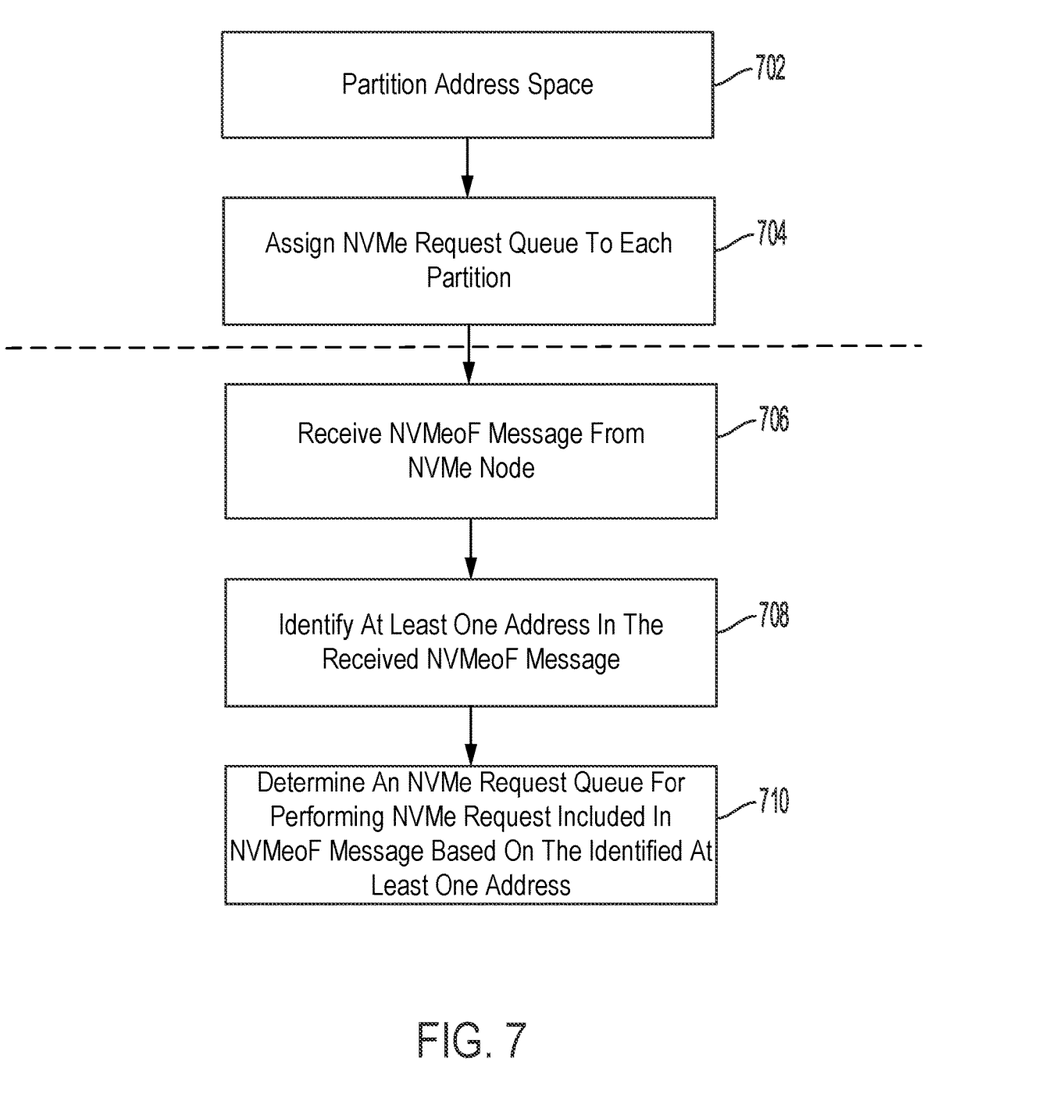
FIG. 7 is a flowchart for an NVMe request management process according to one or more embodiments.

FIG. 7 is a flowchart for an NVMe request management process according to one or more embodiments. The process of FIG. 7 can be performed by, for example, circuitry 118 of a programmable network interface 112 executing transport module 12.

In block 702, the programmable network interface 112 partitions an address space of its node 104. As discussed above, the node 104 can be a server that includes at least one memory or one or more storage devices (e.g., HDDs and/or SSDs), such as memory 108 as in FIG. 1. The programmable network interface can partition an address space representing the memory or storage that is accessible as an NVMe namespace to other NVMe nodes, such as by partitioning the address space into a predetermined number of equally sized address ranges.

In block 704, the programmable network interface 112 assigns an NVMe request queue to each partition from block 702. The partitioning and assignment of NVMe request queues may be performed during a setup or initialization of the node or during an offline phase, as indicated by the dashed line following block 704.

During operation, the programmable network interface in block 706 receives an NVMeoF message from another NVMe node. The NVMeoF message can include NVMeoF and TCP packet headers that are parsed by the programmable network interface for performing match actions. The programmable network interface can identify an NVMe request embedded in the NVMeoF message, such as by identifying an operation code in an NVMe capsule contained in the NVMeoF message. The operation code may indicate, for example, a read command to read data from an address in an NVMe namespace of the node 104 (e.g., the server) or a write command to write data to an NVMe namespace of the node 104.

In block 708, the programmable network interface identifies at least one address in the received NVMeoF message for accessing data in an NVMe namespace of the node 104. After parsing the NVMeoF message, the programmable network interface may discard some or all Ethernet, TCP, and NVMe headers included in the NVMeoF message. The programmable network interface 112 may then only provide a read or write command to a processor 106 or other component of the node 104 with other NVMe parameters to effectively translate the received NVMeoF message to an NVMe read or write command to be performed by node 104. Such translation by the programmable network interface 112 reduces the processing overhead that would otherwise be required of a processor of the node 104, thereby freeing up resources of the processor and improving an overall performance of the node 104.

In block 710, the programmable network interface 112 determines an NVMe request queue from among the NVMe request queues assigned in block 704 for performing the NVMe request included in the NVMeoF message based on the address identified in block 708. The programmable network interface 112 may identify the NVMe request queue using a match action table, for example, that matches the identified address within an address range corresponding to a partition of the NVMe namespace. The queues may buffer or temporarily store NVMe requests (e.g., write commands and read commands) in an on-chip memory of the programmable network interface 112, such as in request queues 16 in FIG. 2. The programmable network interface 112 via flow control module 14 may then send the NVMe requests in a particular order or sequence, such as by using a round robin algorithm, from the NVMe request queues 18 onto bus 110 of the node 104 to load balance the performance of the NVMe messages from among the NVMe request queues 18. Such load balancing by the programmable network interface 112 can ordinarily help prevent large data flows from blocking smaller data flows, which may be time-sensitive or otherwise require a minimum QoS for accessing data.

In some implementations, the match action tables of the programmable network interface 112 may be programmed to identify and consider a priority value (e.g., an 802.1Qbb value) included in the NVMeoF message in determining an NVMe request queue for the NVMe requests. Such priority values may be used by the NVMe nodes sending the NVMeoF messages to associate certain NVMeoF messages with different applications generating the underlying NVMe request that may have different QoS needs, such as a maximum latency for accessing data. In such implementations, the programmable network interface 112 may have a separate queue that may dispatch NVMe messages more frequently or in a greater number per cycle than other lower priority queues for NVMe messages that do not derive from an NVMeoF message including a high priority value.

Figure 8:
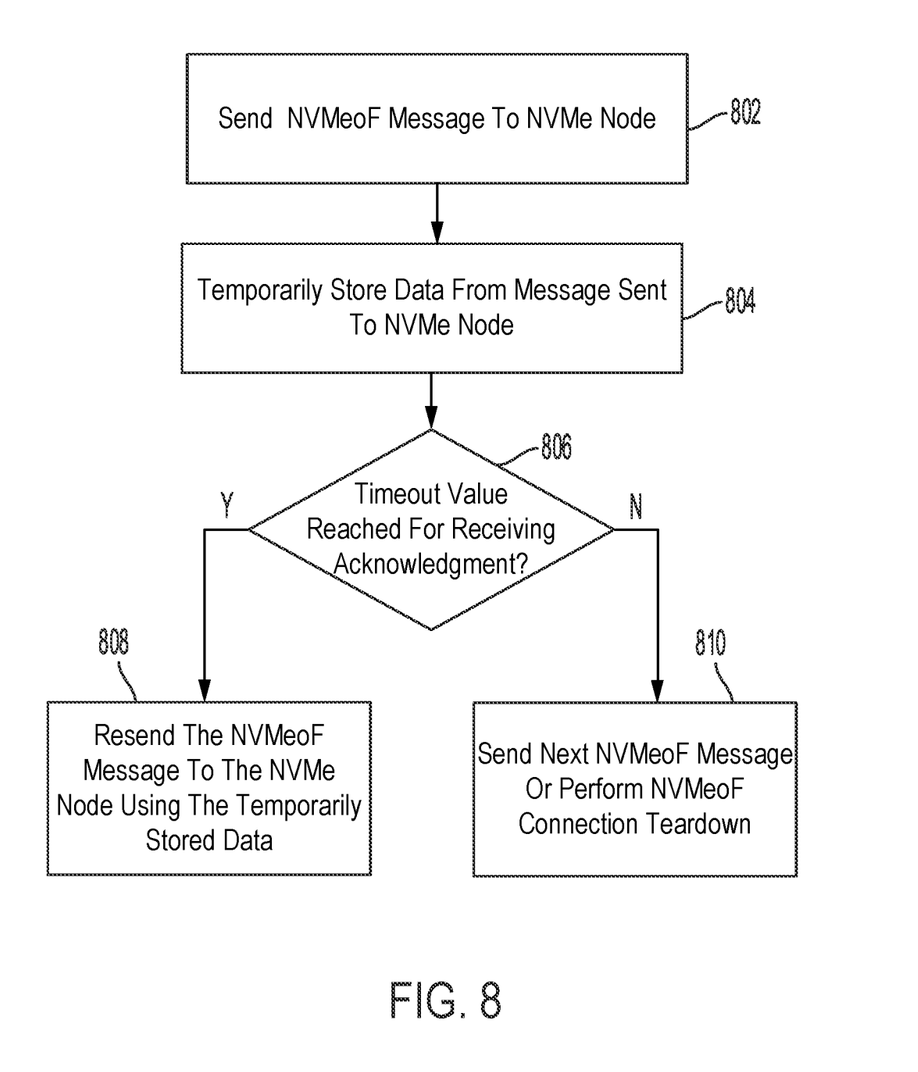
FIG. 8 is a flowchart for an NVMeoF message retransmission process according to one or more embodiments.

FIG. 8 is a flowchart for a message retransmission process according to one or more embodiments. The process of FIG. 8 can be performed by, for example, circuitry 118 of a programmable network interface 112 executing flow control module 14.

In block 802, the programmable network interface 112 sends an NVMeoF message to an NVMe node. The NVMeoF message may originate from an application executed by a processor 106 of the node 104 including the programmable network interface 112. The programmable network interface can add headers, such as TCP, Ethernet, and NVMeoF headers to an NVMe message received from the processor 106 via bus 110 of the node 104.

In block 804, the programmable network interface 112 temporarily stores data, such as a payload, from the NVMeoF message sent to the other NVMe node. The data from the message can be stored locally at the programmable interface 112, such as in memory 120A in FIG. 2. By storing a payload or data from the NVMeoF message being sent by the programmable network interface 112, it is ordinarily possible to more quickly resend the NVMeoF message if needed, such as after receiving an error message or NACK, or following the expiration of a timeout value for receiving an acknowledgment as discussed below. The programmable network interface 112 may handle such errors and the retransmission without involving other components of node 104, such as a processor 104, to further improve the overall performance of the node 104.

In block 806, the programmable network interface 112 determines whether a timeout value has been reached for receiving an acknowledgment of the NVMeoF message sent to the other NVMe node. In some implementations, the programmable network interface 112 may set a timeout register responsive to sending the NVMeoF message, such as by using an egress pipeline of the programmable network interface, for receiving a corresponding acknowledgment. The timeout value can be based on, for example, an average roundtrip packet transmission duration. In some implementations, the timeout value may be adjusted in the field based on, for example, an exponential moving average of sampled round trip times.

In response to the timeout value being reached in block 806 without receiving an acknowledgment, the programmable network interface 112 in block 808 resends the NVMeoF message to the other NVMe node using the data or payload temporarily stored in block 804. As noted above, the programmable network interface 112 may also resend the NVMeoF message in response to receiving an error message or NACK from the other NVMeoF. The resending of the NVMeoF message may be entirely handled by the programmable network interface 112 without involving other components of the node 104.

In response to an acknowledgment being received in block 806 before reaching the timeout value, a next NVMeoF message may be sent in block 810 by the programmable network interface 112. The next NVMeoF message may include an NVMe request from an application executing on node 104 or may include, for example, a "keep alive" message to determine whether the connection with the other NVMe node is still active. In this regard, the programmable network interface 112 may periodically send such keep alive messages to maintain or test the connection with the other NVMe node, without involvement of other components of the node 104, such as a processor 106 of the node.

If the keep alive message is not acknowledged or if the other NVMe node sends a disconnection request, the programmable network interface 112 performs a connection teardown, such as by releasing resources used to maintain the NVMeoF/TCP connection. In some implementations, one or more values for metadata being kept about the connection, such as a last sequence number for used for the connection may be stored as part of connection parameters 18 for future use if the connection with the other NVMe node is activated again. As noted above, the use of connection parameters 18 by the programmable network interface can reduce the time and processing needed to reestablish an NVMeoF/TCP connection.

As discussed above, the offloading of NVMeoF/TCP processing to a programmable network interface can ordinarily improve the performance of a node, such as a server, since such packet processing, like TCP packet processing can be processor intensive. In this regard, many of the operations for such NVMeoF/TCP processing can be handled at a line rate or near line rate by match action stages of such a programmable network interface. In addition, the programmability of programmable network interfaces using programming languages such as P4, for example, can ordinarily allow for flexibility to better adapt to newer versions of the multiple protocols being used and to changing requirements for applications executed by nodes in today's data centers.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A method performed by a programmable network interface of a server, the method comprising:
   receiving a Non-Volatile Memory express over Fabric (NVMeoF) connection request from a node;
   determining whether the node is associated with connection parameters stored in at least one memory of the programmable network interface, wherein the connection parameters are for a plurality of previously active NVMeoF connections with different nodes; and
   in response to determining that the node is associated with connection parameters stored in the at least one memory, establishing a new NVMeoF connection for communicating with the node using the stored connection parameters associated with the node.

2. The method of claim 1, wherein the stored connection parameters include at least one of an indication of a connection state, a negotiated parameter between the server and the node during a previously active connection, a packet sequence number, and a retransmission timeout value.

3. The method of claim 1, further comprising temporarily storing data sent to the node after sending the data in a message.

4. The method of claim 1, further comprising:
   sending a message to the node over network fabric;
   determining whether a timeout value stored in the connection parameters has been reached for receiving an acknowledgment of the sent message from the node; and
   in response to the timeout value being reached without receiving the acknowledgment from the node, resending the message to the node over network fabric.

5. The method of claim 1, further comprising:
   receiving an NVMeoF disconnection request from the node or from an application executed by the server; and
   in response to the received NVMeoF disconnection request, performing an NVMeoF/Transmission Control Protocol (TCP) connection teardown for the new connection.

6. The method of claim 1, further comprising performing a connection setup for an NVMeoF/TCP connection with the node including:
   sending an NVMe/TCP initialization request to the node based on a command received from a processor of the server;
   receiving an NVMe/TCP initialization response from the node;
   sending an NVMeoF connection request to the node; and
   receiving an NVMeoF connection response from the node.

7. The method of claim 1, further comprising:
   parsing an Ethernet header of a message received from the node over network fabric;
   parsing an NVMe capsule of the message received from the node; and
   providing a processor of the server with a portion of the NVMe capsule without providing the parsed Ethernet header and a remaining portion of the NVMe capsule.

8. The method of claim 1, further comprising:
   fragmenting data received from a processor of the server to fit within a network Maximum Transmission Unit (MTU); and
   sending a plurality of messages to the node for the fragmented data.

9. The method of claim 1, further comprising:
   partitioning an address space of the server;
   assigning an NVMe request queue to each partition of the address space;
   receiving an NVMeoF message from the node;
   identifying at least one address in the received NVMeoF message; and
   based on the identified at least one address, determining an NVMe request queue for performing an NVMe request included in the NVMeoF message, wherein the NVMe request is performed by one or more processors of the server.

10. A programmable network interface for a server, the programmable network interface comprising:
    at least one memory configured to store connection parameters for a plurality of previously active Non- Volatile Memory express over Fabric (NVMeoF) connections with different nodes;
means for receiving an NVMeoF connection request from a node;
means for determining whether the node is associated with connection parameters stored in the at least one memory; and
means for, in response to determining that the node is associated with connection parameters stored in the at least one memory, establishing a new NVMeoF connection for communicating with the node using the stored connection parameters associated with the node.

11. A programmable network interface for a server, the programmable network interface comprising:
at least one memory configured to store connection parameters for a plurality of previously active Non-Volatile Memory express over Fabric (NVMeoF) connections with different nodes; and
circuitry configured to:
receive an NVMeoF connection request from a node;
determine whether the node is associated with connection parameters stored in the at least one memory; and
in response to determining that the node is associated with connection parameters stored in the at least one memory, establish a new NVMeoF connection for communicating with the node using the stored connection parameters associated with the node.

12. The programmable network interface of claim 11, wherein the stored connection parameters include at least one of an indication of a connection state, a negotiated parameter between the server and the node during a previously active connection, a packet sequence number, and a retransmission timeout value.

13. The programmable network interface of claim 11, wherein the circuitry is further configured to temporarily store data sent to the node after sending the data in a message.

14. The programmable network interface of claim 11, wherein the circuitry is further configured to:
send a message to the node over network fabric;
determine whether a timeout value stored in the connection parameters has been reached for receiving an acknowledgment of the sent message from the node; and
in response to the timeout value being reached without receiving the acknowledgment from the node, resend the message to the node over network fabric.

15. The programmable network interface of claim 11, wherein the circuitry is further configured to:
receive an NVMeoF disconnection request from the node or from an application executed by the server; and
in response to the received NVMeoF disconnection request, perform an NVMeoF/Transmission Control Protocol (TCP) connection teardown for the new connection.

16. The programmable network interface of claim 11, wherein the circuitry is further configured to perform a connection setup for an NVMeoF/TCP connection with the node including:
sending an NVMe/TCP initialization request to the node based on a command received from a processor of the server;
receiving an NVMe/TCP initialization response from the node;
sending an NVMeoF connection request to the node; and
receiving an NVMeoF connection response from the node.

17. The programmable network interface of claim 11, wherein the circuitry is further configured to:
parse an Ethernet header of a message received from the node over network fabric;
parse an NVMe capsule of the message received from the node; and
provide a processor of the server with a portion of the NVMe capsule without providing the parsed Ethernet header and a remaining portion of the NVMe capsule.

18. The programmable network interface of claim 11, wherein the circuitry is further configured to:
fragment data received from a processor of the server to fit within a network Maximum Transmission Unit (MTU); and
send a plurality of messages to the node for the fragmented data.

19. The programmable network interface of claim 11, wherein the circuitry is further configured to:
partition an address space of the server;
assign an NVMe request queue to each partition of the address space;
receive an NVMeoF message from the node;
identify at least one address in the received NVMeoF message; and
based on the identified at least one address, determine an NVMe request queue for performing an NVMe request included in the NVMeoF message, wherein the NVMe request is performed by one or more processors of the server.

20. The programmable network interface of claim 11, wherein the circuitry is further configured to send to the node an indication of a predetermined number of credits for sending messages to the server based on an available capacity of the determined NVMe request queue that are decreased by the node with each NVMeoF message sent to the server.

* * * * *